Aug. 5, 1930.  E. D. KOHR  1,772,424
FREEZING APPARATUS
Filed April 1, 1930   3 Sheets-Sheet 2

INVENTOR.
BY Elton D. Kohr
Geo. P. Kimmel
ATTORNEY.

Aug. 5, 1930.   E. D. KOHR   1,772,424
FREEZING APPARATUS
Filed April 1, 1930   3 Sheets-Sheet 3
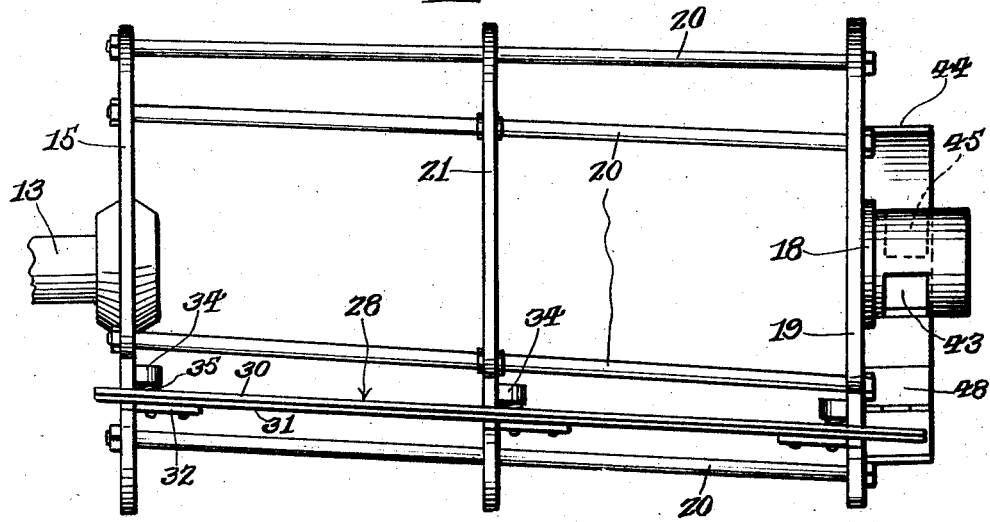
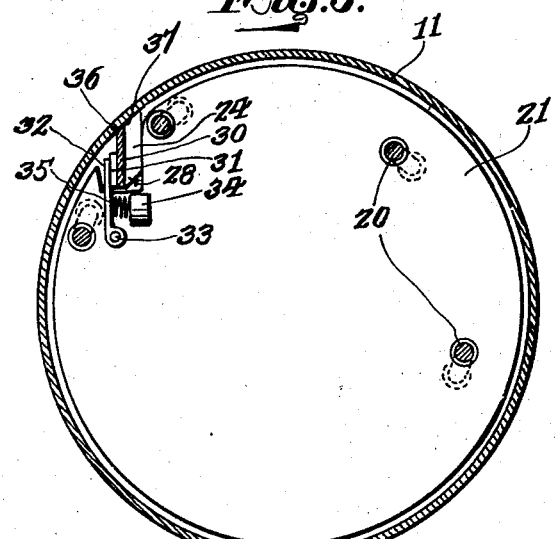
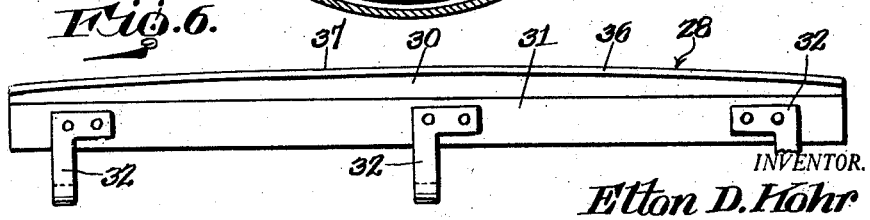
INVENTOR.
Elton D. Kohr
BY
Geo. P. Kimmel
ATTORNEY.

Patented Aug. 5, 1930

1,772,424

UNITED STATES PATENT OFFICE

ELTON D. KOHR, OF YORK, PENNSYLVANIA

FREEZING APPARATUS

Application filed April 1, 1930. Serial No. 440,792.

This invention relates to a freezing apparatus, and has for its primary object to provide, in a manner as hereinafter set forth, an apparatus for producing ice cream, frozen custard and the like in a continuous operation.

A further object of the invention is to provide a freezing apparatus for the purpose aforesaid, in which the ingredients to be frozen are fed into one end of a cylinder rotatably mounted within a refrigerant container, and in which the frozen product is discharged from the opposite end of the cylinder.

A further object of the invention is to provide a freezing apparatus of the character aforesaid in which novel means are employed for agitating the contents of the cylinder and for working the same toward the discharge end of the cylinder.

A further object of the invention is to provide a freezing apparatus of the character aforesaid which is particularly designed to prevent waste, and in which the rotatable cylinder is free from any structure arranged concentrically thereto and extending lengthwise thereof in order to remove any tendency of the frozen product to collect at the actual center of the cylinder.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 4 is a top plan of the apparatus with the refrigerant container and ingredient container removed.

Figure 5 is a section taken on the line 5—5 of Figure 1.

Figure 6 is a detailed view of the scraping element.

Figure 1:
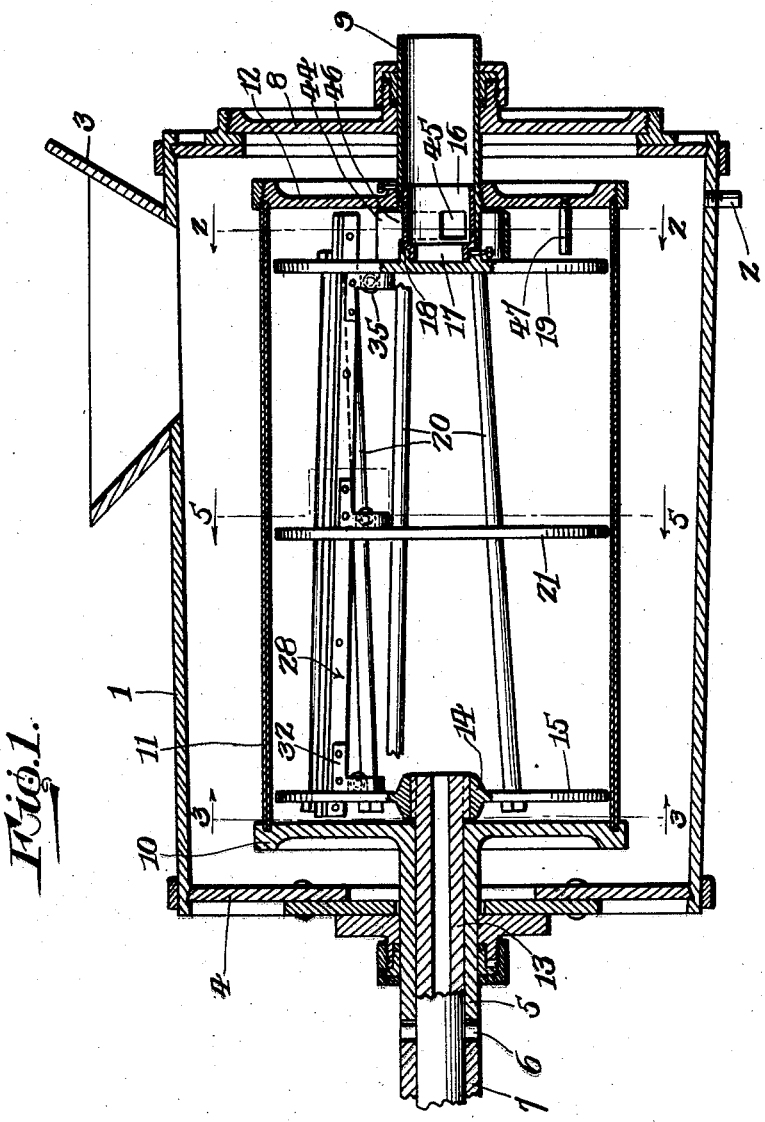
Figure 1 is a vertical section of a freezing apparatus in accordance with this invention.
Figure 2:
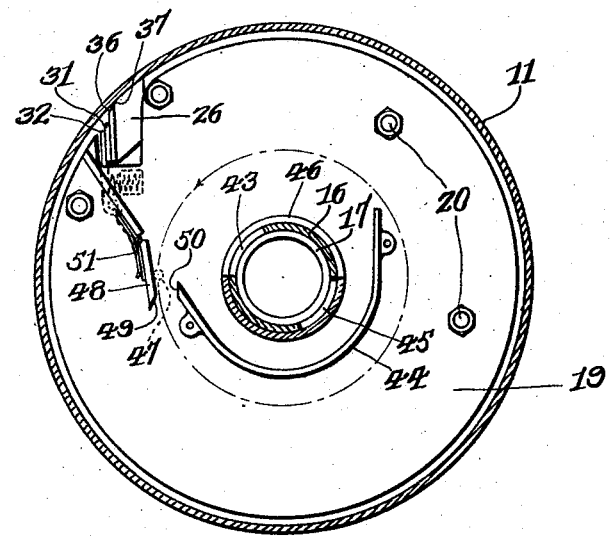
Figure 2 is a section taken on the line 2—2 of Figure 1.
Figure 3:
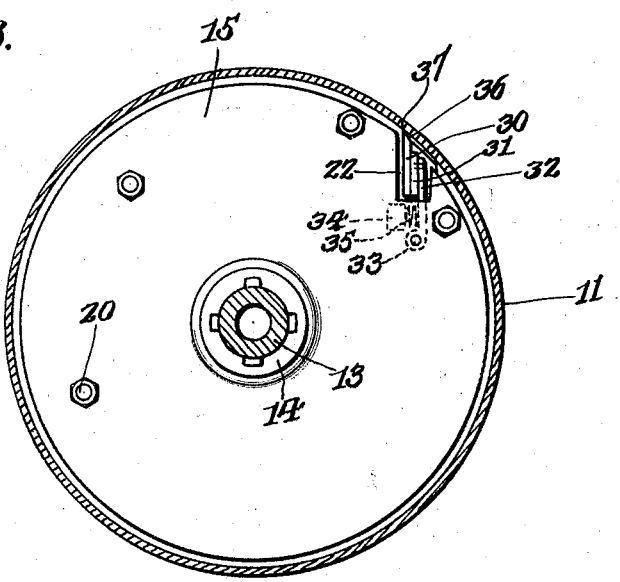
Figure 3 is a section taken on the line 3—3 of Figure 1.

Referring to the drawings in detail, the numeral 1 designates a refrigerant container which is preferably of cylindrical construction with the bottom thereof sloping rearwardly and provided with a drain plug 2 adjacent the rearward end thereof. The container 1 is provided with a suitable hopper 3 in order that a refrigerant, such as crushed ice, may be readily introduced thereinto. Extending through the forward end 4 of the container 1 is a rotatable sleeve 5, the outer end of which is provided with a clutch 6, by means of which the sleeve 5 may be clutched to a hollow drive shaft 7 to rotate therewith. Extending through the rearward end 8 of the container 1 is a hollow sleeve 9 which is rotatable relative to the container.

Formed integrally with the sleeve 5, at the inner end of the latter, is the forward end 10 of a cylindrical container 11 for the ingredients to be frozen. The rearward end 12 of the container 11 has the hollow sleeve 9 extending therethrough and is secured to such sleeve to rotate therewith.

Extending through the drive shaft 7 and sleeve 5 is a stationary hollow supply pipe 13 which projects into the container 11, and through which the ingredients to be frozen may be passed into the container. Keyed to the projecting inner end portion of the pipe 13 is the hub 14 of a disk 15 which is concentrically arranged within the container 11 and the diameter of which is slightly less than the inner diameter of the container 11. The inner end of the sleeve 9 projects from the inner face of the rearward end 12 of the container 11, and disposed within such projecting inner end of the sleeve 9 is a discharge pipe 16 which is rotatable with respect to the sleeve 9. The discharge pipe 16 is formed with an externally threaded, reduced inner end portion 17 which projects from the inner end of the sleeve 9 and which is threaded into a centrally disposed collar 18 on a disk 19. Connecting the disks 15 and 19 are a plurality of combined agitating and tie rods 20 which are eccentrically disposed with respect to the container 11 and extend at inclinations to the axis thereof. The rods 20 extend through and support a disk 21 which is arranged between the disks 15 and 19, and in alignment therewith longitudinally of the container 11.

Formed in the peripheral face of the disk 15 is a recess 22. Formed in the peripheral face of the disk 21 is a recess 24 which is arranged at a greater distance from the vertical, longitudinal center of the container 11 than the recess 22. Formed in the peripheral face of the disk 19 is a recess 26 which is arranged at a greater distance from the vertical, longitudinal center of the container 11 than the recess 24. The recesses 24 and 26 are of materially greater width than the recess 22. Carried by the disks 15, 21 and 19 is a scraper element 28. The element 28 includes a blade 30 fixedly secured to a holder 31, the blade 30 and holder 31 extending through the recesses 22, 24 and 26 in the disks 15, 21 and 19 respectively. The holder 31 is pivotally connected with each of the disks by means of a bracket 32, one end of which is secured to the holder 31, and the other end of which is mounted on a pivot pin 33 projecting from a disk. Adjacent the pin 33 on each disk is a lug 34, and interposed between the lug 34 and bracket 32 is a coiled spring 35. Owing to the relative arrangement of the recesses 22, 24 and 26, the blade 30 is disposed at an outward and downward inclination with respect to the axis of the container 11. The outer longitudinal edge of the blade 30 projects beyond the peripheries of the disks and is bevelled as indicated at 36 to provide a relatively sharp edge 37. In order that the edge 37 may have continuous contact with the inner face of the container 11, the blade 30 gradually increases in width from both ends thereof toward the center. The edge 37 is normally maintained in contact with the inner face of the container 11 by means of the springs 35 bearing against the brackets 32.

Secured to the outer face of the disk 19, in spaced relation to the discharge pipe 16 is a curved collector 44, one end of which extends to the peripheral face of the disk 19 adjacent the recess 26. The rearward edge of the collector 44 is arranged in proximity to the inner face of the rearward end 12 of the container 11. Between the collar 18 and the rearward end 12 of the container 11, the discharge pipe 16 is formed with an oppositely disposed pair of circumferentially extending recesses 43 and 45 which are off center with respect to the vertical plane of the discharge pipe. A circumferentially extending recess 46 of substantially 180° is formed in the periphery of the sleeve 9, the recess 46 being brought into registry with each of the recesses 43 and 45 once during each revolution of the sleeve 9.

Projecting from the inner face of the end 12 of the container 11 is an eccentrically disposed pin 47, the path of travel of which, during the rotation of the container, is in circumferential relation to the major portion of the collector 44, and crosses the end portion of the collector which extends to the peripheral face of the disk 19. The extended end portion of the collector is provided with a hinged gate 48 which is formed at its swinging edge with a bevelled face 49. The gate 48 is normally maintained with its bevelled face 49 in contact with a bevelled seat 50 on the collector 44, by means of a leaf spring 51. The gate 48 is disposed within the path of travel of the pin 47.

In the operation of my improved freezing apparatus, the refrigerant container 1 and supply pipe 13 remain stationary, and the container 11 and sleeves 5 and 9 are rotated. The ingredients to be frozen are constantly fed to the interior of the container 11 through the supply pipe 13 and such ingredients are constantly agitated by the rods 20 disposed within the rotating container 11. Owing to the angular disposition of the scraper element 28, the contents of the container 11 are constantly worked around the peripheral faces of the disks 21 and 19, and through the recesses 24 and 26 toward the rearward end of the container 11. Any frozen product adhering to the inner face of the container 11 will be cut therefrom by the edge 37 of the blade 30.

The frozen product forced past the disk 19 will be maintained in proximity to the inner end of the sleeve 9 by the collector 44, and when the recess 46 is brought into registry with the recesses 43 and 45, the frozen product will be forced through the latter into the discharge pipe 16. Owing to the diametrically opposite disposition of the recesses 43 and 45, and to the length of the recess 46, the latter will be in registry with one of the former at all times whereby the frozen product will be forced into the discharge pipe 16 in a continuous stream. Any tendency of the frozen product to congeal above the inner end of the sleeve 9 is eliminated by the pin 47 which continually revolves around the major portion of the collector 44, passing through the gate 48 during each revolution. As soon as the pin clears the gate, the latter is automatically closed by the action of the spring 51 to prevent any of the frozen product from passing through the gate.

It is to be noted that owing to the absence of any structure extending lengthwise within the container 11 and arranged concentrically thereto, there is no possibility of a gradually increasing core of frozen product collecting centrally of the container.

What I claim is:

1. A freezing apparatus comprising, a stationary refrigerant container, a rotatable ingredient container within the refrigerant container, means for delivering ingredients to the ingredient container at the forward end thereof, means for conducting the ingredients from the rearward end of the ingredient container, a plurality of disks within the ingredient container, a plurality of combined agitator and tie rods connecting the disks together, and a scraper blade carried by the disks and extending at an inclination to the axis of the ingredient container for constantly working the ingredients toward the rearward end thereof, said combined agitator and tie rods being arranged eccentrically of the ingredient container and extending at inclinations to the axis thereof.

2. A freezing apparatus comprising, a stationary refrigerant container, a rotatable ingredient container within the refrigerant container, means for delivering ingredients to the ingredient container at the forward end thereof, means for conducting the ingredients from the rearward end of the ingredient container, a plurality of disks within the ingredient container, a plurality of combined agitator and tie rods connecting the disks together, and a scraper blade carried by the disks and extending at an inclination to the axis of the ingredient container for constantly working the ingredients toward the rearward end thereof, said blade having an arcuate cutting edge in continuous contacting relation with the inner face of the ingredient container.

3. A freezing apparatus comprising, a stationary refrigerant container, a rotatable ingredient container within the refrigerant container, means for delivering ingredients to the ingredient container at the forward end thereof, means for conducting the ingredients from the rearward end of the ingredient container, a plurality of disks within the ingredient container, a plurality of combined agitator and tie rods connecting the disks together, and a scraper blade carried by the disks and extending at an inclination to the axis of the ingredient container for constantly working the ingredients toward the rearward end thereof.

4. A freezing apparatus comprising, a stationary refrigerant container, a rotatable ingredient container within the refrigerant container, a supply pipe extending into the ingredient container at the forward end thereof, a discharge pipe leading from the rearward end of the ingredient container, a disk carried by each of said pipes, said disks being concentrically arranged within the ingredient container and having their peripheral faces spaced from the peripheral wall of such container, a plurality of combined agitator and tie rods connecting said disks together, said rods being arranged eccentrically of the ingredient container, a disk supported by said rods intermediate the first named disks, and a scraper blade carried by the disks and extending at an inclination to the axis of the ingredient container.

5. A freezing apparatus comprising, a stationary refrigerant container, a rotatable ingredient container within the refrigerant container, a supply pipe extending into the ingredient container at the forward end thereof, a discharge pipe leading from the rearward end of the ingredient container, a disk carried by each of said pipes, said disks being concentrically arranged within the ingredient container and having their peripheral faces spaced from the peripheral wall of such container, a plurality of combined agitator and tie rods connecting said disks together, said rods being arranged eccentrically of the ingredient container, a disk supported by said rods intermediate the first named disks, each of said disks having its peripheral face formed with a recess, the recesses in the intermediate and rearward disks being of greater width than the recess in the forward disk, said recesses being arranged out of alignment longitudinally of the ingredient container, and a scraper blade extending through said recesses and having an edge face in continuous contact with the inner face of the ingredient container.

6. A freezing apparatus comprising, a stationary refrigerant container, a rotatable ingredient container within the refrigerant container, a stationary supply pipe extending into the ingredient container at the forward end thereof, a disk carried by the supply pipe and disposed within the ingredient container, a rotatable sleeve extending into the ingredient container at the rearward end thereof, a stationary discharge pipe projecting into the inner end of said sleeve, a disk carried by said discharge pipe, said discharge pipe having a pair of spaced, circumferentially extending recesses, said sleeve having a circumferentially extending recess for registry with the recesses in the discharge pipe, a curved collector element passing beneath said sleeve, a plurality of combined agitator and tie rods connecting said disks and extending at inclinations to the axis of the ingredient container, and a scraper blade carried by said disks.

7. A freezing apparatus comprising, a stationary refrigerant container, a rotatable ingredient container within the refrigerant container, a stationary supply pipe extending into the ingredient container at the forward end thereof, a disk carried by the supply pipe and disposed within the ingredient container, a rotatable sleeve extending into the ingredient container at the rearward end thereof, a stationary discharge pipe projecting into the inner end of said sleeve, a disk carried by said discharge pipe, said discharge pipe having a pair of spaced, circumferentially extending recesses, said sleeve having a circumferentially extending recess for registry with the recesses in the discharge pipe, a curved collector element passing beneath said sleeve, a plurality of combined agitator and tie rods connecting said disks and extending at inclinations to the axis of the ingredient container, and a scraper blade carried by said disks, said scraper blade having an arcuate cutting edge in continuous contact with the inner face of the ingredient container and extending at an inclination to the axis thereof.

8. A freezing apparatus comprising, a stationary refrigerant container, a rotatable ingredient container within the refrigerant container, a stationary supply pipe extending into the ingredient container at the forward end thereof, a disk carried by the supply pipe and disposed within the ingredient container, a rotatable sleeve extending into the ingredient container at the rearward end thereof, a stationary discharge pipe projecting into the inner end of said sleeve, a disk carried by said discharge pipe, said discharge pipe having a pair of spaced, circumferentially extending recesses, said sleeve having a circumferentially extending recess for registry with the recesses in the discharge pipe, a curved collector projecting from the rear face of the disk carried by said sleeve, said collector passing beneath the sleeve and having an end portion extending to the peripheral face of the disk on the sleeve, a spring actuated, normally closed gate in the extended end portion of the collector, a pin projecting inwardly from the rearward end of the ingredient container, said pin revolving around a major portion of the collector and passing through said gate at each revolution, a plurality of combined agitator and tie rods connecting said disks and extending at inclinations to the axis of the ingredient container, and a scraper blade carried by said disks.

In testimony whereof, I affix my signature hereto.

ELTON D. KOHR.